(12) United States Patent
Leidich et al.

(10) Patent No.: US 10,458,815 B2
(45) Date of Patent: Oct. 29, 2019

(54) SENSOR ARRANGEMENT FOR THE CONTACTLESS SENSING OF ANGLES OF ROTATION ON A ROTATING PART

(71) Applicant: Robert Bosch GmbH, Stuttgart (DE)

(72) Inventors: Stefan Leidich, Rutesheim (DE); Joerg Oberlaender, Hildesheim (DE); Oliver Krayl, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/517,332

(22) PCT Filed: Oct. 1, 2015

(86) PCT No.: PCT/EP2015/072694
§ 371 (c)(1),
(2) Date: Apr. 6, 2017

(87) PCT Pub. No.: WO2016/055348
PCT Pub. Date: Apr. 14, 2016

(65) Prior Publication Data
US 2018/0238714 A1 Aug. 23, 2018

(30) Foreign Application Priority Data
Oct. 9, 2014 (DE) .................. 10 2014 220 446

(51) Int. Cl.
*G01D 5/20* (2006.01)
(52) U.S. Cl.
CPC ........... *G01D 5/2026* (2013.01); *G01D 5/202* (2013.01)
(58) Field of Classification Search
CPC ..... G01D 5/2006; G01D 5/202; G01D 5/2026
See application file for complete search history.

(56) References Cited

U.S. PATENT DOCUMENTS

2002/0196015 A1   12/2002   Zapf
2005/0253576 A1   11/2005   Nyce
(Continued)

FOREIGN PATENT DOCUMENTS

CN   101363710 A      2/2009
DE   197 38 836 A1    3/1999
(Continued)

OTHER PUBLICATIONS

International Search Report corresponding to PCT Application No. PCT/EP2015/072694, dated Jan. 8, 2016 (German and English language document) (7 pages).

*Primary Examiner* — Noam Reisner
(74) *Attorney, Agent, or Firm* — Maginot, Moore & Beck LLP

(57) ABSTRACT

In one embodiment, a sensor arrangement for the contactless sensing of angles of rotation on a rotating part includes a disk-shaped target coupled to the rotating part. The disc-shaped target has at least one metal surface and generates at least one piece of information for ascertaining the instantaneous angle of rotation of the rotating part in connection with a coil arrangement. The coil arrangement has at least one flat detection coil. The arrangement further includes at least one measuring circuit that converts the inductance of a corresponding at least one flat detection coil into a measuring signal. The inductance changes due to eddy-current effects, as a function of the degree of overlap with the at least one metal surface of the rotating target. The arrangement further includes an evaluation and control unit that detects the measuring signal using measurement techniques and evaluates the signal for calculating the angle of rotation.

15 Claims, 2 Drawing Sheets

(56) References Cited

U.S. PATENT DOCUMENTS

| | | | |
|---|---|---|---|
| 2008/0164869 A1 | 7/2008 | Bach et al. | |
| 2013/0027046 A1* | 1/2013 | Leif | G01R 31/06 324/418 |
| 2013/0127449 A1* | 5/2013 | Backes | G01D 5/2291 324/207.18 |

FOREIGN PATENT DOCUMENTS

| | | |
|---|---|---|
| DE | 103 52 351 A1 | 12/2004 |
| DE | 10 2007 037 217 A1 | 2/2009 |
| EP | 1 122 520 A1 | 8/2001 |
| FR | 2 882 818 A1 | 9/2006 |
| JP | 2000-97982 A | 4/2000 |
| JP | 2006-133094 A | 5/2006 |
| JP | 2011-7796 A | 1/2011 |

\* cited by examiner

SENSOR ARRANGEMENT FOR THE CONTACTLESS SENSING OF ANGLES OF ROTATION ON A ROTATING PART

This application is a 35 U.S.C. § 371 National Stage Application of PCT/EP2015/072694, filed on Oct. 1, 2015, which claims the benefit of priority to Serial No. DE 10 2014 220 446.1, filed on Oct. 9, 2014 in Germany, the disclosures of which are incorporated herein by reference in their entirety.

The present disclosure is directed to a sensor arrangement for the contactless sensing of angles of rotation according to definition of the species in independent patent claim 1.

The measurement of angles of rotation on rotating parts is generally carried out by using magnetic sensors. The rotating part to be measured is equipped with a permanent magnet. A corresponding magnetic field sensor which, for example, may be integrated into an integrated circuit, measures the field strength in two or three spatial directions and derives the angular orientation.

In addition, various inductive rotational angle sensors are known from the related art. The coupling between an exciter coil and one or multiple sensor coils is largely influenced by the rotational angle position of a coupling element (target). The evaluation of coupling factors requires complex electronics.

DE 197 38 836 A1 describes, for example, an inductive angle sensor including a stator element, a rotor element, and an evaluation circuit. The stator element has an exciter coil which is subjected to a periodic AC voltage, and multiple receiving coils. The rotor element specifies the intensity of the inductive coupling between the exciter coil and the receiving coils, as a function of its angular position relative to the stator element. The evaluation circuit determines the angular position of the rotor element relative to the stator element, from the voltage signals induced in the receiving coils.

SUMMARY

In contrast, the sensor arrangement according to the present disclosure for the contactless sensing of angles of rotation having the features of the independent patent claim 1 has the advantage that the evaluation, or the determination using measurement techniques, of the coil inductance or the effect of the metallic covering on the at least one detection coil is carried out via a conversion of the coil inductance into a measurement signal, preferably into an analog voltage. The implemented measuring principle converts magnetic energy into electrical energy. This advantageously enables the determination of the inductance of the detection coil using measurement techniques having low hardware complexity.

Embodiments of the sensor arrangement enable the implementation of the measuring principle according to the present disclosure using economical standard components such as transistors, diodes, and capacitors, in connection with a microcontroller which has an analog/digital converter. Since many such microcontrollers are already present in the vehicle, such an inductance measurement may be implemented simply and economically. In addition, the measuring circuits may always be easily integrated into designs which already include a microcontroller for other functions. Due to the small number of components, a specific ASIC design is possible but not required. The use of the measuring principle is thus possible in a highly flexible manner.

Exemplary embodiments of the present disclosure provide a sensor arrangement for the contactless sensing of angles of rotation on a rotating part which is coupled with a disk-shaped target which has at least one metal surface, and generates at least one piece of information for ascertaining the instantaneous angle of rotation of the rotating part in connection with a coil arrangement which has at least one flat detection coil. According to the present disclosure, at least one measuring circuit converts the inductance of a corresponding flat detection coil, which changes due to eddy-current effects, as a function of the degree of overlap with the at least one metal surface of the rotating target, into a measuring signal which an evaluation and control unit detects using measurement techniques and evaluates for calculating the angle of rotation.

The evaluation and control unit may presently be understood to be an electrical circuit or an electrical device, for example, a control device, which processes or evaluates detected sensor signals. The evaluation and control unit may have at least one interface, which may be designed as hardware and/or as software. In a hardware-based design, the interfaces may, for example, be part of a so-called system ASIC, which includes a wide variety of functions of the evaluation and control unit. However, it is also possible that the interfaces are self-contained integrated circuits or are made up at least partially of discrete elements. In a software-based design, the interfaces may be software modules which, for example, are present on a microcontroller, in addition to other software modules. Also advantageous is a computer program product including program code which is stored on a machine-readable carrier such as a semiconductor memory, a hard-disk memory, or an optical memory, and is used for carrying out the evaluation, if the program is executed by the evaluation and control unit.

Advantageous improvements on the sensor arrangement for the contactless sensing of angles of rotation specified in the independent claim 1 are possible via the measures and refinements listed in the dependent claims.

It is particularly advantageous that the at least one measuring circuit may include a capacitor which may be electrically connected in parallel with the detection coil to be evaluated, and which is able to absorb energy stored via the inductance of the detection coil during a measuring process. The magnetic energy of the inductance of the detection coil may preferably be transmitted by means of a directed current pulse via a diode to the capacitor, which is able to store the transmitted energy as electrical energy. During an evaluation process, the capacitor may output the stored electrical energy as a measuring signal to the evaluation and control unit. Preferably, the measuring signal is a voltage signal or a current signal.

In an advantageous embodiment of the sensor arrangement according to the present disclosure, the at least one measuring circuit may have multiple electronic switches, which the evaluation and control unit may switch via corresponding control signals. The electronic switches may, for example, be designed as transistors, preferably as field-effect transistors. By controlling corresponding electronic switches, the evaluation and control unit may connect the detection coil to be evaluated to an operating voltage and to a reference potential during an excitation phase. At the start of the measuring process, the evaluation and control unit may disconnect the detection coil to be evaluated from the reference potential, for example, by switching the corresponding electronic switch. At the start of the evaluation process, the evaluation and control unit may disconnect the at least one detection coil from the operating voltage, for example, by switching the corresponding electronic switch, and connect a connecting point of the capacitor to the reference potential. The evaluation and control unit may tap the measuring signal at a shared connecting point of the capacitor and the corresponding detection coil for evaluation.

In an additional advantageous embodiment of the sensor arrangement according to the present disclosure, the evaluation and control unit may include a microcontroller with an A/D converter, which is able to evaluate the measuring signal.

An embodiment of the present disclosure is illustrated in the drawings and is described in greater detail in the description below. In the drawings, identical reference numerals refer to components or elements which carry out identical or similar functions.

DETAILED DESCRIPTION

Figure 1:
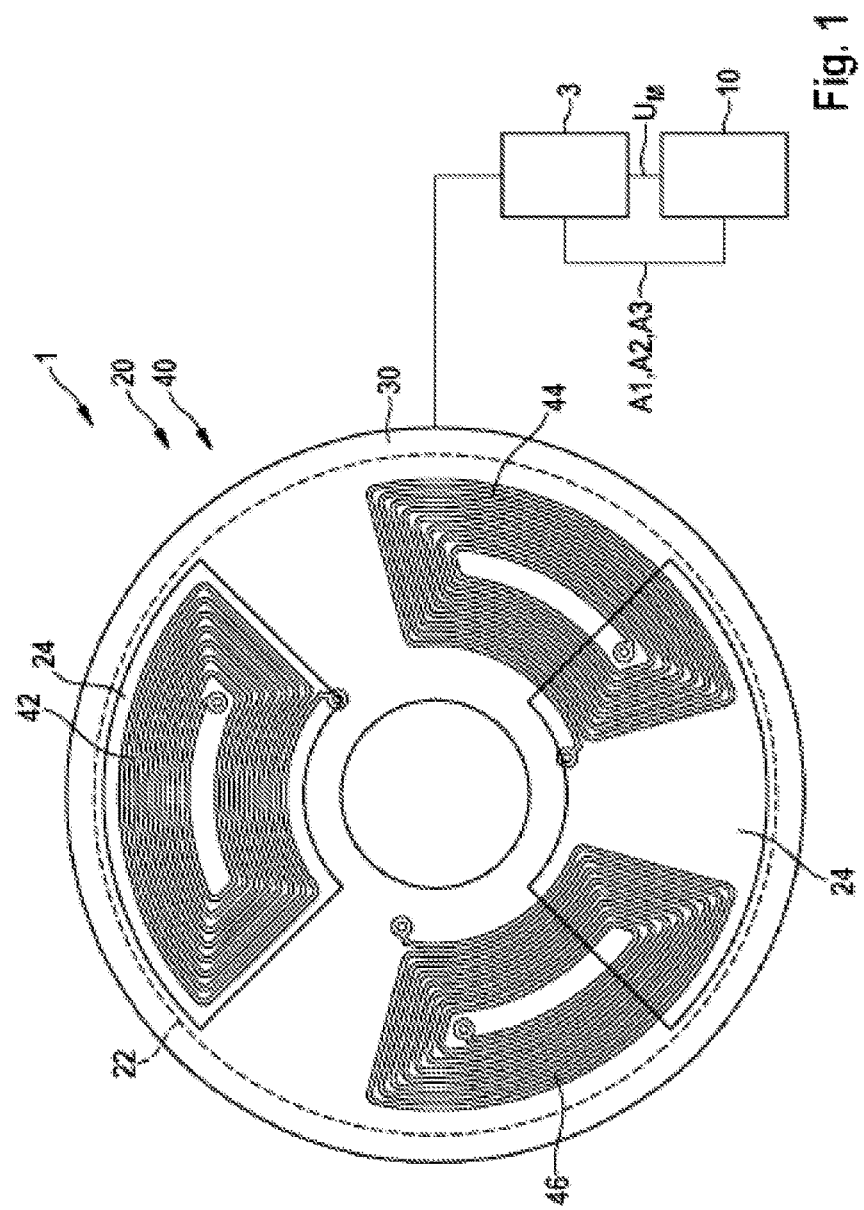
FIG. 1 shows a schematic top view of an exemplary embodiment of a sensor arrangement according to the present disclosure for the contactless sensing of angles of rotation.
Figure 2:
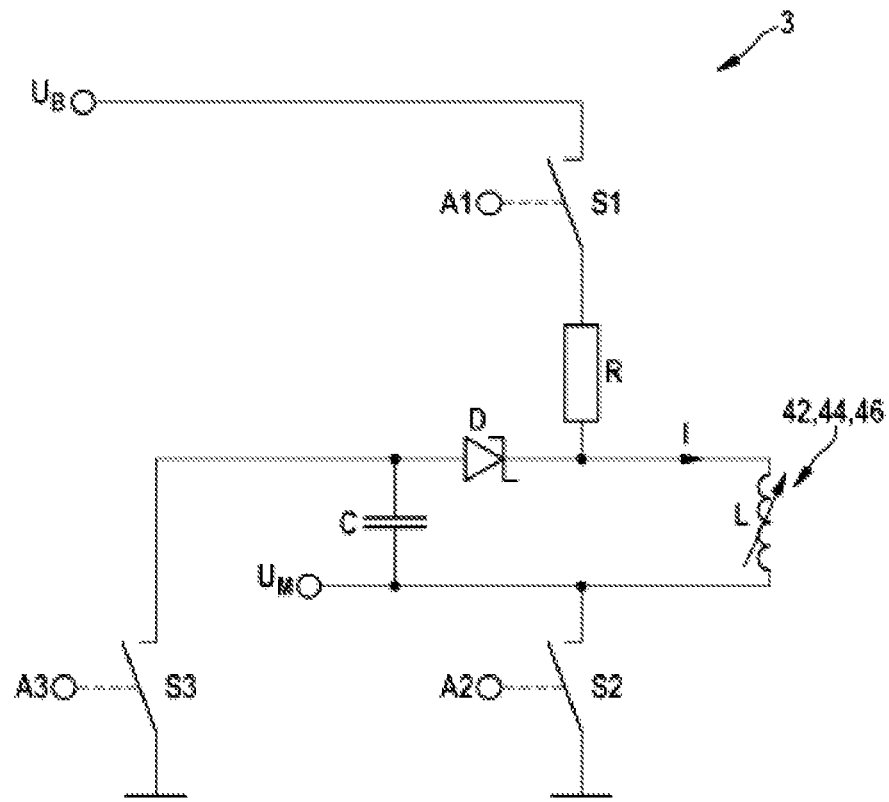
FIG. 2 shows a schematic circuit diagram of an exemplary embodiment of a measuring circuit for the sensor arrangement according to the present disclosure from FIG. 1.

As is apparent from FIGS. 1 and 2, the depicted exemplary embodiment of a sensor arrangement 1 according to the present disclosure for the contactless sensing of angles of rotation on a rotating part includes a target 20 coupled with the rotating part, which has an annular disk-shaped base body 22 with at least one metal surface 24, and a coil arrangement 40 having at least one flat detection coil 42, 44, 46, which is arranged on a round printed circuit board 30. Of course, the printed circuit board 30 does not have to be round; the printed circuit board 30 may also have another suitable shape. In connection with the coil arrangement 40, the target 20 generates at least one piece of information for ascertaining the instantaneous angle of rotation of the rotating part. According to the present disclosure, at least one measuring circuit 3 converts the inductance L of a corresponding flat detection coil 42, 44, 46, which changes due to eddy-current effects, as a function of the degree of overlap with the at least one metal surface 24 of the rotating target 20, into a measuring signal UM which an evaluation and control unit 10 detects using measurement techniques and evaluates for calculating the angle of rotation.

In the depicted exemplary embodiment, the coil arrangement 40 includes three flat detection coils 42, 44, 46 which are equally distributed on the circumference of a circle, and the rotating targets 20 includes two metal surfaces 24 which influence the inductances L of the flat detection coils 42, 44, 46 due to eddy-current effects, as a function of the degree of overlap. In this case, the measuring circuit 3 generates a measuring signal $U_M$ which represents the change in inductance of the respective detection coil 42, 44, 46. In the depicted exemplary embodiment, the sensor arrangement 1 includes three measuring circuits 3, each being associated with one of the detection coils 42, 44, 46.

As is furthermore apparent from FIG. 1, the coil arrangement 40 in the depicted exemplary embodiment is arranged on a round printed circuit board 30 and is electrically connected to the evaluation and control unit 10. The annular disk-shaped base body 22 of the target 20, which depicted as transparent in the drawings, is arranged at a predefined constant axial distance above or below the printed circuit board 30. During an excitation phase of the detection coil 42, 44, 46 with an alternating current, the overlap of the detection coils 42, 44, 46 coils with the conductive metal surfaces 24 results in the generation of an induction voltage, which is short-circuited by the metal. The current generates a magnetic field which counteracts its source. Finally, as a result, the inductance L of the detection coil 42, 44, 46 appears to be lower. The measurement of the inductance L allows the determination of the degree of overlap and thus the determination of the angle of rotation. In the depicted exemplary embodiments, the rotating part, which is not depicted in detail, may be a shaft which, having sufficient lateral play, is routed through the circular opening in the printed circuit board 30, and is connected to the base body 22 of the target 20 in a rotationally fixed manner.

As is furthermore apparent from FIG. 2, the at least one measuring circuit 3 includes a capacitor C which is electrically connected in parallel with the detection coil 42, 44, 46 to be evaluated, and which absorbs energy stored via the inductance L of the detection coil 42, 44, 46 during a measuring process. In the depicted exemplary embodiment, the magnetic energy of the inductance L of the detection coil 42, 44, 46 is transmittable by means of a directed current pulse via a diode D to the capacitor C, which stores the transmitted energy as electrical energy. During an evaluation process, the capacitor C outputs the stored electrical energy as a measuring signal $U_M$ to the evaluation and control unit 10. In addition, the at least one measuring circuit 3 has multiple switches S1, S2, S3, which the evaluation and control unit 10 switches via corresponding control signals A1, A2, A2. In the depicted exemplary embodiment, the electronic switches S1, S2, S3 are designed as transistors, preferably as field-effect transistors.

As is furthermore apparent from FIG. 2, each of the detection coils 42, 44, 46 is connectable to an operating voltage $U_B$ via a first electronic switch S1 which is switchable by the evaluation and control unit 10 via a first control signal A1, and to a reference potential, here, ground, via a second electronic switch S2 which is switchable by the evaluation and control unit 10 via a second control signal A2. During the excitation phase, the evaluation and control unit 10 connects the detection coil 42, 44, 46 to be evaluated by connecting the first electronic switch S1 to the operating voltage $U_B$ and by connecting the second electronic switch S2 to the reference potential. At the start of the measuring process, the evaluation and control unit 10 disconnects the detection coil 42, 44, 46 to be evaluated by switching the second switch S2 from the reference potential. After the switching process of the second switch S2, the energy of the corresponding detection coil 42, 44, 46 is transmitted through the diode D to the capacitor C. The voltage $U_M$ at the capacitor C may be calculated approximately using equations (1) and (2).

$$\frac{C}{2}U^2 = \frac{L}{2}I^2 \tag{1}$$

$$U = I\sqrt{\frac{L}{C}} \tag{2}$$

At the start of the evaluation process, the evaluation and control unit 10 disconnects the at least one detection coil 42, 44, 46 from the operating voltage $U_B$ by switching the first switch S1; the second switch S2 is already open. By switching a third switch S3, the evaluation and control unit 10 connects a connecting point of the capacitor C to the reference potential. As a result, the evaluation and control unit 10 may tap the measuring signal $U_M$ at a shared connecting point of the capacitor C and the corresponding detection coil 42, 44, 46. The measuring signal $U_M$ may thus be measured against the reference potential as an analog voltage signal at the connecting point between the detection coil 42, 44, 46 and the capacitor C. For evaluating the measuring signal $U_M$, the evaluation and control unit 10 includes a microcontroller with an A/D converter which converts the analog measuring signal $U_M$ into a digital signal.

The advantage of the described measuring principle is that by using advantageous standard parts, for example, the transistors S1, S2, S3, the diode D, and the capacitor C, a measurement of the inductance L may already be carried out by means of a microcontroller which has an A/D converter, and is thus always capable of being easily integrated into designs which already include a microcontroller for other functions. Due to the small number of components, a specific ASIC design is possible but not required. The use of the measuring principle is thus highly flexible.

In the case of a change in inductance L from, for example, 1.25 µH to 1.0 µH over an angle of rotation of 70° and a storage capacitor C of 100 pF, a current I of 56 mA would result in a voltage $U_M$ at the capacitor C of approximately 4.38 V or 5.0 V (~60% conversion efficiency) in the corresponding detection coil 42, 44, 46. The limitation of the current I may take place via a series resistor R which, for example, has a value of approximately 50Ω. The charge transfer process takes approximately 1 µs. The measurement period is thus potentially very short. In order to resolve an angle of 0.1°, is it necessary to detect voltage differences of approximately 1 mV. If the measuring range of the A/D converter is not limited to the required range of approximately 4.0 to 5.0 V, a resolution of 13 bits may be used.

The measurement of DC voltages at capacitors is advantageously possible with relatively low noise. Reduction of the noise amplitude to below 1 mV is possible. However, the measuring signal is directly dependent on the capacitance of the capacitor C, which is subject to a temperature response (<30 ppm/K). The aging and the voltage dependence of the capacitance of the capacitor C may be largely minimized by using NP0 dielectrics. During measurement, the diode D, which is preferably designed as a Schottky diode, is in parallel with the capacitor C. The corresponding leakage current of the diode D is highly dependent on the temperature, and may, for example, be $10^4$ µA at −25° C. and 100 µA at 125° C. In the case of a measurement voltage of 5 V, this corresponds to a discharge resistance of at least 50 kΩ). The time constant of the corresponding RC element is thus at least 5 µs. The A/D converter preferably has a sampling rate of >200 kS. By taking two or more samples, the exponential voltage drop may be determined, and the original measurement voltage may be extrapolated. In addition, the temperature may be determined via the known relationship between the diode leakage current and the temperature. This information may advantageously be used for further temperature corrections.

The transmission of the magnetic energy of the corresponding detection coil 42, 44, 46 into electrical energy of the capacitor C takes place via a directed current pulse, wherein the diode D prevents a reverse flow. AC signals cause EMC interference. They could be rectified by the diode D. It is optionally possible to implement a bypass for alternating fields without canceling the diode effect. The system is in principle capable of detecting interference. Since the measurement of the capacitor voltage takes place when the coil excitement is deactivated, the voltage of the induced interference signal may be advantageously distinguished from the measuring signal $U_M$.

The invention claimed is:

1. A sensor arrangement for the contactless sensing of angles of rotation on a rotating part, the sensor arrangement comprising:
   a disk-shaped target coupled to the rotating part, the disc-shaped target having at least one metal surface, and operable to generate at least one piece of information for ascertaining an instantaneous angle of rotation of the rotating part in connection with a coil arrangement;
   the coil arrangement having at least one flat detection coil;
   at least one measuring circuit operable to convert inductance of a corresponding at least one flat detection coil into a measuring signal and the at least one measuring circuit including a first switch and a second switch, the inductance of the at least one flat detection coil configured to change due to eddy-current effects as a function of a degree of overlap with the at least one metal surface of the rotating target and the at least one measuring circuit including a capacitor; and
   an evaluation and control unit configured to detect the measuring signal using measurement techniques and to evaluate the measuring signal for calculating the angle of rotation by switching the first switch and the second switch via corresponding control signals such that (i) the evaluation and control unit is configured to switch the first switch via a first control signal to connect the at least one detection coil to an operating voltage and switch the second switch via a second control signal to connect the second switch to a reference potential to commence an excitation phase, (ii) the evaluation and control unit is configured to switch the second switch to disconnect the at least one detection coil to commence a measuring phase, and (iii) the evaluation and control unit is configured to switch the first switch in order to disconnect the at least one detection coil from the operating voltage to commence an evaluation phase, and further configured to connect the at least one detection coil to be evaluated to an operating voltage and to a reference potential to commence an excitation phase, wherein the at least one flat detection coil is charged and the capacitor is not charged during the excitation phase.

2. The sensor arrangement as claimed in claim 1, wherein the capacitor is electrically connected in parallel with the at least one flat detection coil to be evaluated and being configured to absorb energy stored via the inductance of the at least one flat detection coil during a measuring process.

3. The sensor arrangement as claimed in claim 2, wherein magnetic energy of the inductance of the at least one flat detection coil is transmittable using a directed current pulse via a diode to the capacitor, the capacitor further configured to store the transmitted energy as electrical energy.

4. The sensor arrangement as claimed in claim 3, wherein the capacitor is further configured to output the stored electrical energy during an evaluation process as the measuring signal to the evaluation and control unit.

5. The sensor arrangement as claimed in claim 3, wherein the diode is a Schottky diode.

6. The sensor arrangement as claimed in claim 1, wherein the measuring signal is a voltage signal or a current signal.

7. The sensor arrangement as claimed in claim 1, wherein the at least one measuring circuit has multiple electronic switches, the evaluation and control unit being further configured to switch the electronic switches via corresponding control signals.

8. The sensor arrangement as claimed in claim 7, wherein the evaluation and control unit is further configured to disconnect the at least one detection coil to be evaluated from a reference potential at start of a measuring process.

9. The sensor arrangement as claimed in claim 7, wherein at start of an evaluation process, the evaluation and control unit is configured to (i) disconnect the at least one detection coil from an operating voltage, (ii) connect a connecting point of the capacitor to a reference potential, and (iii) tap the measuring signal at a shared connecting point of the capacitor and the corresponding at least one detection coil.

10. The sensor arrangement as claimed in claim 9, wherein the evaluation and control unit includes a microcontroller with an A/D converter, the A/D converter being operable to evaluate the measuring signal.

11. The sensor arrangement as claimed in claim 7, wherein the multiple electronic switches are transistors.

12. The sensor arrangement as claimed in claim 11, wherein the multiple electronic switches are field-effect transistors.

13. The sensor arrangement as claimed in claim 1, wherein the evaluation and control unit has at least one interface.

14. The sensor arrangement as claimed in claim 1, wherein a first end of the capacitor is directly connected to a first end of the at least one flat detection coil, a second end of the capacitor is directly connected to an anode end of a Schottky diode, and a cathode end of the Schottky diode is directly connected to a second end of the at least one flat detection coil.

15. The sensor arrangement as claimed in claim 1, wherein the capacitor and the at least one flat detection coil are connected by a non-switched connection.

* * * * *